(12) United States Patent
Otsuka

(10) Patent No.: US 8,780,191 B2
(45) Date of Patent: Jul. 15, 2014

(54) VIRTUAL MICROSCOPE SYSTEM

(75) Inventor: Takeshi Otsuka, Tokyo (JP)

(73) Assignee: Olympus Corporation, Tokyo (JP)

( * ) Notice: Subject to any disclaimer, the term of this patent is extended or adjusted under 35 U.S.C. 154(b) by 439 days.

(21) Appl. No.: 12/942,223

(22) Filed: Nov. 9, 2010

(65) Prior Publication Data

US 2011/0109735 A1 May 12, 2011

(30) Foreign Application Priority Data

Nov. 9, 2009 (JP) ................. 2009-256312

(51) Int. Cl.
| | | |
|---|---|---|
| H04N 9/47 | (2006.01) | |
| H04N 7/18 | (2006.01) | |
| G09G 5/02 | (2006.01) | |
| G01J 3/44 | (2006.01) | |
| G01B 9/02 | (2006.01) | |
| G01J 3/02 | (2006.01) | |
| G01J 3/32 | (2006.01) | |
| G01J 3/08 | (2006.01) | |
| G01J 3/42 | (2006.01) | |
| G02B 21/36 | (2006.01) | |

(52) U.S. Cl.
CPC .............. *G01J 3/02* (2013.01); *G01J 3/0248* (2013.01); *G01J 3/32* (2013.01); *G01J 3/08* (2013.01); *G01J 3/42* (2013.01); *G02B 21/365* (2013.01)
USPC .............. 348/79; 345/597; 356/301; 356/521

(58) Field of Classification Search
USPC ........................................... 382/128; 348/79
See application file for complete search history.

(56) References Cited

U.S. PATENT DOCUMENTS

| | | | |
|---|---|---|---|
| 6,870,612 B2 * | 3/2005 | Jiang .............................. | 356/301 |
| 2002/0122044 A1 * | 9/2002 | Deering ........................ | 345/597 |
| 2008/0084567 A1 * | 4/2008 | Fabrikant et al. ............. | 356/521 |
| 2008/0294032 A1 * | 11/2008 | Levenson et al. ............. | 600/407 |

FOREIGN PATENT DOCUMENTS

| | | |
|---|---|---|
| JP | H04-138341 A | 5/1992 |
| JP | 2000-346802 A | 12/2000 |
| JP | 2009-014354 | 1/2009 |
| JP | 2010-500569 A | 1/2010 |
| WO | 2008/019160 A2 | 2/2008 |

OTHER PUBLICATIONS

Japanese Notification of Reasons for Refusal mailed Jul. 16, 2013 in corresponding Japanese Patent Application No. 2009-256312 together with English-language translation.

* cited by examiner

*Primary Examiner* — Hee-Yong Kim
(74) *Attorney, Agent, or Firm* — Scully, Scott, Murphy & Presser, P.C.

(57) ABSTRACT

A virtual microscope system capable of obtaining a stained sample image and a statistical data of spectra in a short period of time is provided, the virtual microscope system includes an image obtaining unit for obtaining a stained sample image, a spectrum obtaining unit for obtaining a spectrum of the stained sample image, an optical path setting unit for setting an optical path of a light flux passed through the stained sample with respect to the image obtaining unit and the spectrum obtaining unit and a control unit for controlling to repeat obtaining the stained sample image by the image obtaining unit and obtaining the spectrum of the stained sample image by the spectrum obtaining unit in the observation field of the stained sample to create a virtual slide and a spectrum table of the stained sample.

13 Claims, 18 Drawing Sheets

FIG. 8
(a)
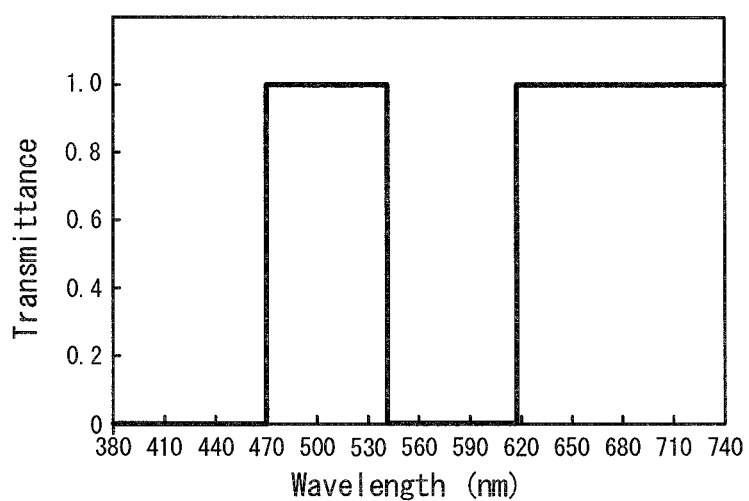
(b)
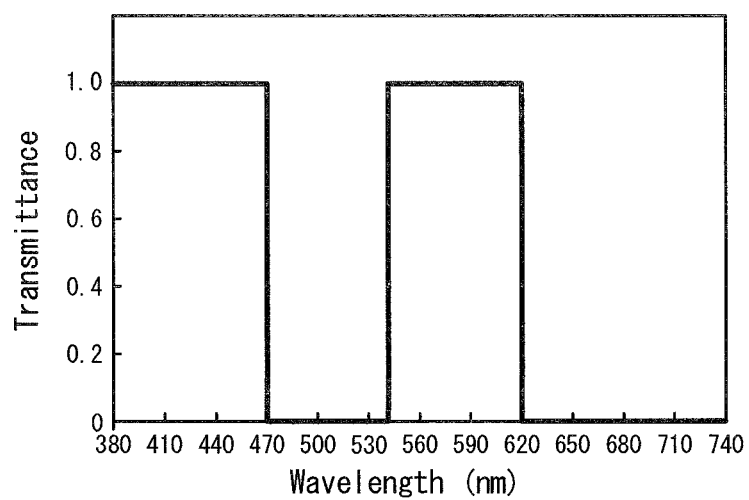

VIRTUAL MICROSCOPE SYSTEM

CROSS-REFERENCE TO RELATED APPLICATION

The present application claims priority from Japanese Application No. 2009-256312 filed on Nov. 9, 2009, the content of which is incorporated herein by reference.

FIELD OF THE INVENTION

The present invention relates to virtual microscope systems for estimating spectra of a stained sample image obtained by capturing a stained sample.

BACKGROUND OF THE INVENTION

The spectral transmittance spectrum is one of physical quantities representing a physical property specific to a subject of imaging. The spectral transmittance is a physical quantity representing a ratio of transmitted light to incident light at each wavelength and, unlike the color information such as an RGB value that depends on the change of illumination light, is the information specific to an object, whose values do not change depending on extrinsic influences. Thus the spectral transmittance is used in various fields as the information to reproduce the color of the subject itself. For example, in the field of pathology diagnosis that uses body tissue samples, particularly, pathological specimens, the spectral transmittance has been used, as an example of a spectral characteristic value, for analyzing images obtained by capturing samples. The examples of use of the spectral transmittance for pathology diagnosis will now be described below in detail.

As one of the pathological examinations for pathology diagnosis, the tissue diagnosis by which tissue is taken from a lesioned part and is observed with a microscope for diagnosing a disease or the degree of lesion expansion is known. This tissue diagnosis is also called "biopsy", by which a block sample obtained by organ harvesting or a pathological specimen obtained by needle biopsy is sliced into several micrometers thick and is magnified with a microscope to obtain various findings, and this diagnosis has been widely used. Transmission observation using an optical microscope is one of the most common observation methods, because equipment and material are relatively inexpensive and easy to be handled, and the method has been used for many years. In the case of the transmission observation, the sliced samples absorb and scatter almost no light and are almost transparent and colorless. Thus, the samples are generally stained by a dye prior to observation.

Various staining methods have been proposed, and more than a hundred methods have been proposed in total. Particularly, for pathological specimens, hematoxylin-eosin staining (hereinafter referred to as "HE staining") that uses bluish-purple hematoxylin and red eosin as pigment has been used as a standard staining method.

Hematoxylin is a natural substance extracted from plants, and has no stainability itself. However, hematin, an oxidative product of hematoxylin, is a basophilic dye and binds to a negatively charged substance. Deoxyribonucleic-acid (DNA) contained in cell nucleus is negatively charged by a phosphate group contained as a component and, thus is stained bluish-purple when it binds to hematin. As described above, a substance having stainability is its oxidative product, hematin, and is not hematoxylin. However, hematoxylin is commonly used as a name of dye, and this applies to the following explanations.

On the other hand, eosin is an acidophilic dye and binds to a positively charged substance. Amino acid and protein are charged negatively or positively depending on its pH environment, and have a strong tendency to be charged positively under acidity. Thus, there are some cases where acetic acid is added to eosin solution. The protein contained in cytoplasm is stained red or pale red when binding to eosin.

After being HE stained (a stained sample), cell nucleuses, bone tissues and the like are stained bluish-purple, and cytoplasm, connective tissue, blood cells and the like are stained red in the sample, which offers visibility. Thus an observer understands the size and positional relation and the like of elements constituting tissues such as cell nucleuses, thereby enabling the observer to determine a state of the sample morphologically.

In addition to a visual inspection by the observer, the stained sample can also be observed by multiband imaging displayed on a display screen of an external device. In the case where images are displayed on a screen, processing for estimating the spectral transmittance at each point of the sample from the obtained multiband image and processing for estimating dye amount of a dye that stains the sample based on the estimated spectral transmittance and the like are performed and, the image to be displayed, which is an RGB image of the sample for display, is composed.

Methods of estimating the spectral transmittance at each point of the sample from the multiband image of the sample include, for example, principal component analysis, Wiener estimation method and the like. The Wiener estimation is widely known as one of the linear filtering methods for estimating an original signal from an observed signal on which noise is superimposed and is a method for minimizing errors in view of the statistical properties of the observed object and the noise (observed noise). Signals from a camera contain some sort of noise. Thus the Wiener estimation is an extremely useful method for estimating an original signal.

A method of creating a virtual slide by composing a display image from a multiband image of a sample is described below. The virtual slide is an image created by patching one or more multiband images captured by a microscope device and, for example, an image created by patching a plurality of high-resolution images at each portion of a stained sample captured by a high-power microscope objective lens. The virtual slide means a wide-field and high-definition multi-band image of the entire view of a stained sample.

First, a multiband image of a sample is captured, for example, based on a frame sequential method, while rotating a filter wheel to switch 16 pieces of bandpass filters. In this manner, multiband images having a pixel value of 16 bands can be obtained at each point of the sample. Although the dye is originally distributed three-dimensionally in a sample to be observed, the dye cannot be captured as a three-dimensional image as it is by using an ordinary transmission observation system, and the illumination light that has passed the sample is observed as a two-dimensional image projected on an imaging element of a camera. Therefore, each point described herein means a point at the sample corresponding to each pixel of the projected imaging element.

For an arbitrary point (pixel) x of a captured multiband image, a relation expressed by the following Equation (1) based on a response system of a camera is established between the pixel value g(x, b) in the band b and the spectral transmittance t(x, λ) at the corresponding point of the sample.

$$g(x,b) = \int_\lambda f(b,\lambda) s(\lambda) e(\lambda) t(x,\lambda) d\lambda + n(b) \quad (1)$$

In the Equation (1), denotes wavelength, f(b,λ) denotes spectral transmittance of a "b"th filter, s(λ) denotes spectral sensitivity characteristic of a camera, e(λ) denotes spectral emission characteristic of illumination, and n(b) denotes observation noise in the band b. b denotes a serial number for identifying the band, and is an integer satisfying 1≤b≤16. In the practical calculation, the following Equation (2) obtained by discretizing the Equation (1) in a wavelength direction is used.

$$G(x)=F\text{SET}(x)+N \quad (2)$$

In the Equation (2), when the number of sample points in a wavelength direction is designated as D and the number of bands is designated as B (in this case, B=16), G(x) denotes a matrix of B rows by one column corresponding to the pixel value g(x, b) at the point x. In the same manner, T(x) denotes a matrix of D rows by one column corresponding to t(x, λ), and F denotes a matrix of B rows by D columns corresponding to f(b, λ). On the other hand, S denotes a diagonal matrix of D rows by D columns, and a diagonal element corresponds to s(λ). In the same manner, E denotes a diagonal matrix of D rows by D columns, and a diagonal element corresponds to e(λ). N denotes a matrix of B rows by one column corresponding to n(b). In the Equation (2), because equations of a plurality of bands are put together using a matrix, a variable b representing a band is not described. Further, an integral of the wavelength λ is replaced by a product of matrices.

To simplify the description, the matrix H defined by the following Equation (3) is introduced. The matrix H is also called a system matrix.

$$H=FSE \quad (3)$$

Thus, the Equation (2) is replaced by the following Equation (4).

$$G(x)=HT(x)+N \quad (4)$$

Next, the spectral transmittance at each point of the sample is estimated from the captured multiband image by using the Wiener estimation. The estimation value of the spectral transmittance (spectral transmittance data), T^(x), can be calculated by the following Equation (5). T^ indicates that a symbol, "^(hat)", representing an estimation value, is put over T.

$$\hat{T}(x)=(x) \quad (5)$$

W is expressed by the following Equation (6), and is referred to as "Wiener estimation matrix" or "estimation operator used for the Wiener estimation".

$$W=R_{SS}H^t(R_{SS}H^t+R_{NN})^{-1} \quad (6)$$

Where, ( )$^t$: transposed matrix, and ( )$^{-1}$: inverse matrix.

In the Equation (6), $R_{SS}$ is a matrix of D rows by D columns and represents an autocorrelation matrix of spectral transmittance of the sample, and $R_{NN}$ is a matrix of B rows by B columns and represents an autocorrelation matrix of noise of the camera used for capturing.

In order to calculate an estimation operator W by which each main element such as cell nucleus, cytoplasm, blood cell, cavum and the like can appropriately be estimated, spectrum of each main element such as cell nucleus, cytoplasm, blood cell, cavum and the like are needed previously. Thus the user needs to measure the spectrum of each main element of the sample previously with a spectrometer while moving the measuring position, which may be troublesome.

In order to solve the above mentioned problem, for example, the Japanese Unexamined Patent Application Publication No. 2009-014354 discloses an image processing device by which an appropriate estimation operator, W, is calculated automatically. In this image processing device, a spectrum of each main element of a sample is measured with a spectrometer while moving the estimating position automatically, and an estimation operator W is calculated from the measured spectrum. Then, the estimation operator W is evaluated and if it is not appropriate, a spectrum of each main element of the sample is measured again and, thus an appropriate estimation operator W is calculated automatically.

According to the image processing device disclosed in the aforementioned document, an appropriate estimation operator W is calculated automatically, thereby reducing a burden on the user. However, the inventor of the present invention considers that, in the aforementioned image processing device, spectrum of a plurality of elements of a sample should be measured previously with a spectrometer while moving the measurement position. Thus the processing requires a lot of time and as a result, estimation of spectrum of the sample will be time-consuming.

In view of the aforementioned problem, the object of the present invention is to provide a virtual microscope system by which a stained sample image obtained by capturing the stained sample and statistical data of spectra can be obtained in a short period of time.

SUMMARY OF THE INVENTION

The first aspect of the invention which achieves the aforementioned objects is a virtual microscope system for capturing a stained sample to estimate a spectrum, which includes:

an image obtaining unit for obtaining a stained sample image of one or more bands of the stained sample;

a spectrum obtaining unit for obtaining a spectrum at one or more predetermined portions of the stained sample image;

an optical path setting unit for setting an optical path of a light flux passed through the stained sample, with respect to the image obtaining unit and the spectrum obtaining unit, so that the spectrum of the stained sample image can be obtained by the spectrum obtaining unit each time the image obtaining unit obtains the stained sample image; and a control unit for controlling, in two or more observation fields of the stained sample, to repeat obtaining the stained sample image by the image obtaining unit and obtaining the spectrum of the stained sample image by the spectrum obtaining unit so that a virtual slide and a spectrum table of the stained sample are created.

The second aspect of the invention resides in the virtual microscope system in accordance with the first aspect, wherein the optical path setting unit has an optical path switching mirror for switching the optical path of the light flux so that the light flux passed through the stained sample is selectively incident on the image obtaining unit or the spectrum obtaining unit.

The third aspect of the invention resides in the virtual microscope system in accordance with the first aspect, wherein the optical path setting unit has a disposition switching mechanism for selectively placing the image obtaining unit or the spectrum obtaining unit on the optical path of the light flux passed through the stained sample.

The fourth aspect of the invention resides in the virtual microscope system in accordance with the first aspect, wherein the optical path setting unit has a beam splitter for splitting the optical path of the light flux so that the light flux passed through the stained sample is incident on the image obtaining unit and the spectrum obtaining unit simultaneously.

The fifth aspect of the invention resides in the virtual microscope system in accordance with the first aspect, wherein the image obtaining unit is any one of an RGB camera, a monochrome camera, a two or more bands camera, and a multiband camera provided with a camera and an optical filter.

The sixth aspect of the invention resides in the virtual microscope system in accordance with the first aspect, wherein the spectrum obtaining unit has an optical magnification increasing unit for magnifying the stained sample image and obtains the spectrum from the stained sample image magnified by the optical magnification increasing unit.

The seventh aspect of the invention resides in the virtual microscope system in accordance with the first aspect, further including:

a spectrum obtaining position pixel value calculating unit for obtaining a pixel value at the position of the spectrum obtained by the spectrum obtaining unit from the stained sample image obtained by the image obtaining unit, wherein as the spectrum table, a spectrum table containing at least the spectrum and the pixel value is created.

The eighth aspect of the invention resides in the virtual microscope system in accordance with the first aspect, further including:

an estimation operator calculating unit for calculating an estimation operator from the spectrum table; and a spectrum estimating unit for estimating a spectrum of a pixel that makes up the virtual slide by using the estimation operator.

The ninth aspect of the invention resides in the virtual microscope system in accordance with the eighth aspect, further including:

a spectrum selecting unit for selecting a plurality of spectra corresponding to the pixel value of the pixel that makes up the virtual slide from the spectrum table, wherein the estimation operator calculating unit calculates an estimation operator for each pixel value from the plurality of spectra selected by the spectrum selecting unit; and the spectrum estimating unit estimates the spectrum of the pixel that makes up the virtual slide by using the estimation operator for each of the pixel value.

The tenth aspect of the invention resides in the virtual microscope system in accordance with the eighth aspect, further including:

a spectrum selecting unit for selecting a spectra corresponding to the pixel value of the pixel that makes up the virtual slide from the spectrum table, wherein the spectrum selected by the spectrum selecting unit is a spectrum estimation value.

The eleventh aspect of the invention resides in the virtual microscope system in accordance with the seventh aspect, wherein the pixel value stored in the spectrum table is any one of an obtained pixel value, a pixel value converted to a color space and a feature value calculated from the pixel value.

The twelfth aspect of the invention resides in the virtual microscope system in accordance with the seventh aspect, wherein the spectrum table consists of a data set containing at least the spectrum, the pixel value and the information of the pixel position from which the spectrum is obtained.

The thirteenth aspect of the invention resides in the virtual microscope system in accordance with the seventh aspect, wherein the spectrum obtaining position pixel value calculating unit calculates any one of a pixel value of the center pixel in an obtaining area of the spectrum, a statistical value of the pixel value of the pixel in the obtaining area, and a value calculated by convolving the pixel value in the obtaining area with a light-receiving characteristic of the spectrum obtaining unit.

The virtual microscope system according to the present invention can create statistical data of spectra and a virtual slide almost simultaneously. Thus a spectra of a stained sample can be estimated at high speed.

BRIEF DESCRIPTION OF THE DRAWING

FIG. 8 is a diagram showing a spectral transmittance characteristic of two optical filters constituting a filter unit shown in FIG. 6;

DESCRIPTION OF THE PREFERRED EMBODIMENTS

Figure 1:
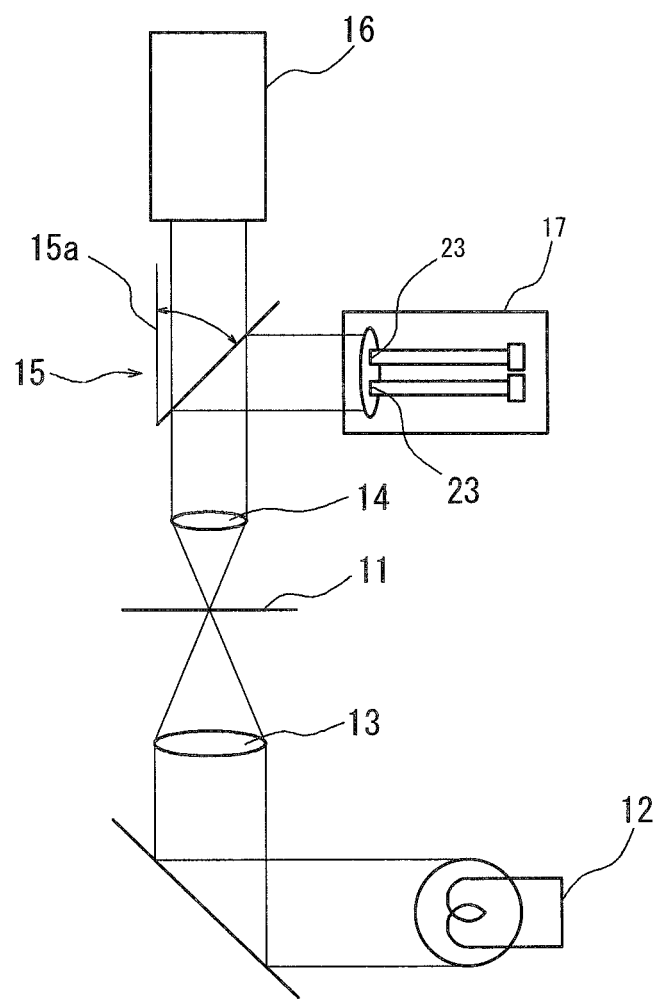
FIG. 1 is a diagram for illustrating the principles of a virtual microscope system in accordance with a first embodiment of the present invention.

Preferred embodiments of the present invention will now be described in detail with reference to the accompanying drawings. It should be noted that the present invention is not limited by the embodiments shown below, and the same numerical symbols are assigned to the same portions in the drawings.

First Embodiment

Figure 2:
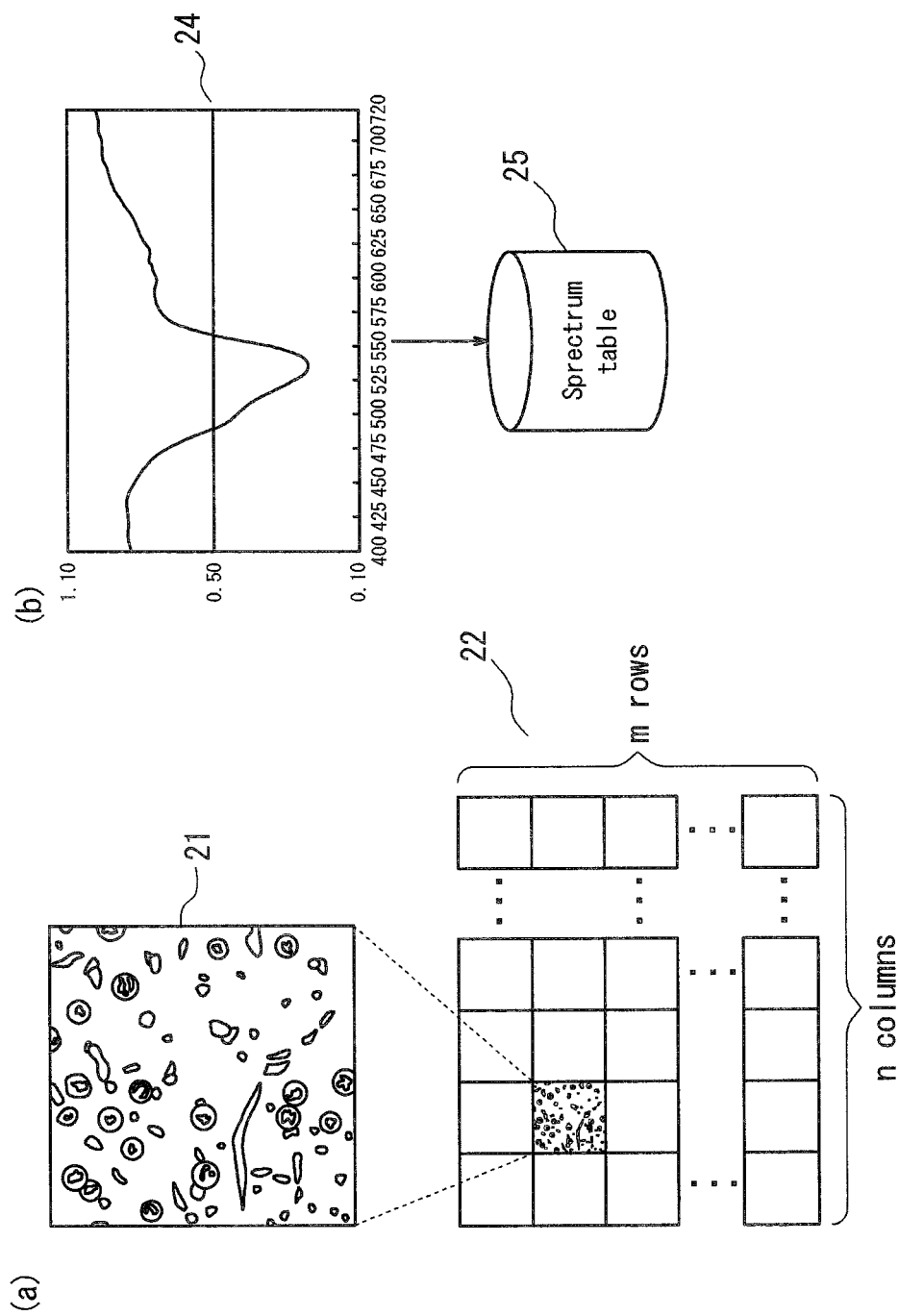
FIG. 2 is a diagram for illustrating the principles of the virtual microscope system in accordance with the first embodiment of the present invention.

FIGS. 1 and 2 are diagrams for illustrating the principles of a virtual microscope system in accordance with a first embodiment of the present invention. In the virtual microscope system in accordance with the present embodiment, a stained sample (hereinafter referred to as an "object sample") 11 that is placed on a stage of a microscope apparatus is illuminated by a light source 12 through an illumination optical system 13, and the light transmitted therethrough is incident on an optical path setting unit 15 through an observation optical system 14 comprising a microscope objective lens. The optical path setting unit 15 is, for example, constituted by an optical path switching mirror 15a. The optical path switching mirror 15a is constituted, for example, by a reflective mirror that is evacuatable relative to the optical path of the incident light. The optical path of the incident light from the observation optical system 14 is directed to an image obtaining unit 16 by evacuating the optical path switching mirror 15a from the incident light path, and the optical path of the incident light from the observation optical system 14 is directed to a spectrum obtaining unit 17 by inserting the optical path switching mirror 15a into the incident light path.

As shown in FIG. 2(a), an object sample image 21 of one or more bands of the object sample 11 is obtained by the image obtaining unit 16 with the optical path switching mirror 15a evacuated from the incident light path, and the obtained object sample image 21 is stored in a storage unit, which is not shown, as a portion of a virtual slide 22. Thereafter, a spectrum 24 (see FIG. 2(b)) of one or more predetermined portions 23 (see FIG. 1) of the object sample image 21 obtained by the image obtaining unit 16 is obtained by the spectrum obtaining unit 17 with the optical path switching mirror 15a inserted into the incident light path, and each obtained spectrum 24 of predetermined portions 23 is registered in a spectrum table 25 as shown in FIG. 2. FIG. 1 shows an example of obtaining the spectrum 24 of each of two predetermined portions 23 of the object sample image 21. Obtaining the object sample image 21 and obtaining its spectrum 24 are repeated while moving the object sample 11, thereby creating a virtual slide 22 of m×n pieces and a spectrum table 25 almost simultaneously.

In the above mentioned explanation, after obtaining the object sample image 21, the spectrum 24 at its predetermined portion 23 is obtained. However, the order may be reversed. In addition, the spectrum obtaining unit 17 may be constituted to obtain not only the spectrum 24 at each of two predetermined portions 23 of the object sample image 21 but also the spectrum 24 at one predetermined portion 23 or as shown in FIG. 3, the spectrum 24 at each of three or more predetermined portions 23 by magnifying the incident light that is outputted from the observation optical system 14 and passes through the optical path switching mirror 15a with a magnifying optical system 27.

Figure 4:
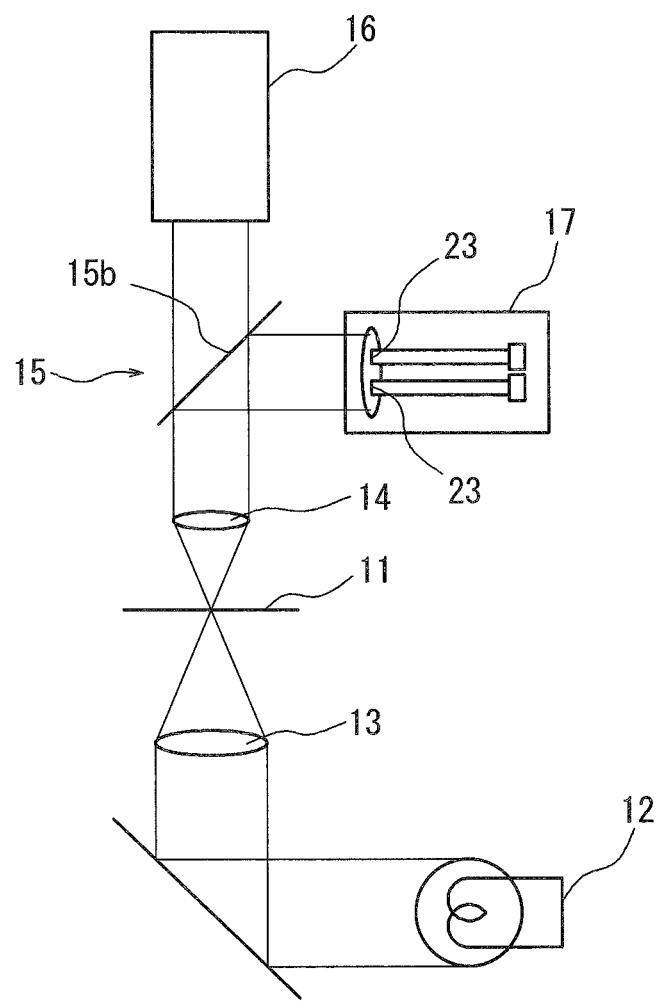
FIG. 4 is a diagram showing another configuration of an optical path setting unit shown in FIG. 1.

Further, as shown in FIG. 4, the optical path setting unit 15 may be constituted to split the optical path of the incident light from the observation optical system 14 by using a beam splitter 15b such as a half mirror, etc., and to set an optical path for the image obtaining unit 16 and for the spectrum obtaining unit 17 respectively. In this case, obtaining the object sample image 21 by the image obtaining unit 16 and obtaining the spectrum 24 of the object sample image 21 by the spectrum obtaining unit 17 can be performed simultaneously.

Figure 3:
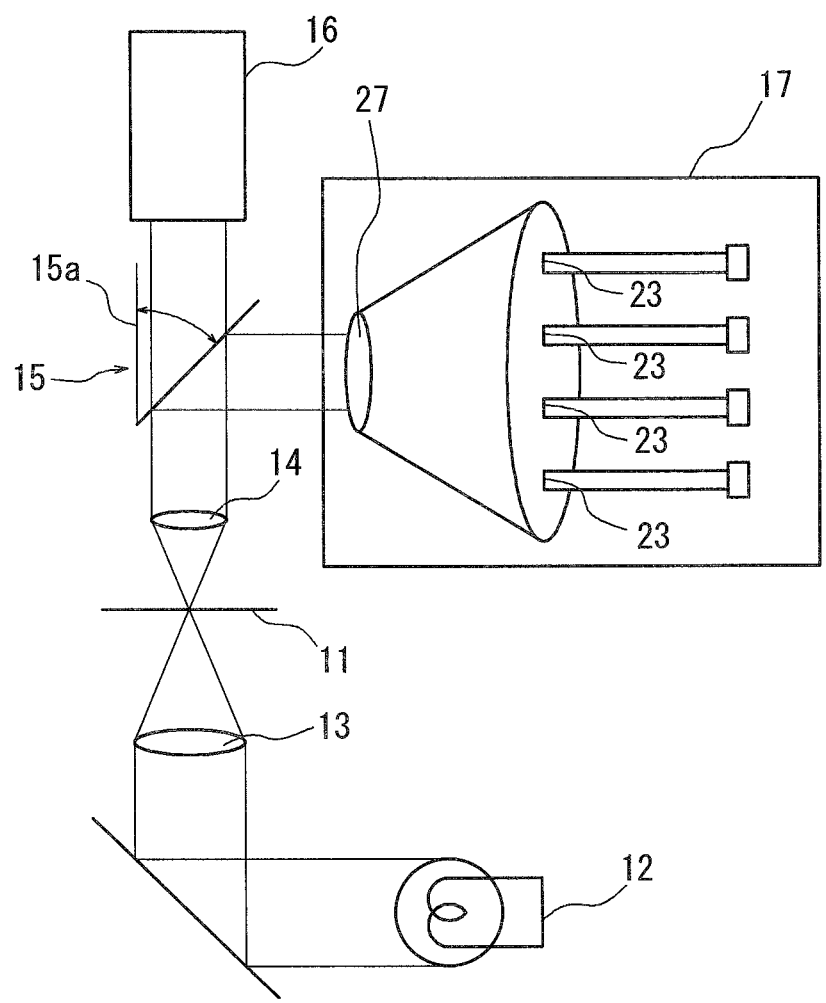
FIG. 3 is a diagram showing a modification example of a spectrum obtaining unit shown in FIG. 1.

In addition, when the optical path setting unit 15 is constituted by using the evacuatable optical path switching mirror 15a as shown in FIGS. 1 and 3, the transmitted light of the object sample 11 can be used efficiently, thereby decreasing the illumination light amount compared to the example shown in FIG. 4. Further, as shown in FIG. 4, when the optical path setting unit 15 is constituted by using the beam splitter 15b, the virtual slide 22 and the spectrum table 25 can be created in a shorter time compared to FIGS. 1 and 3.

Figure 5:
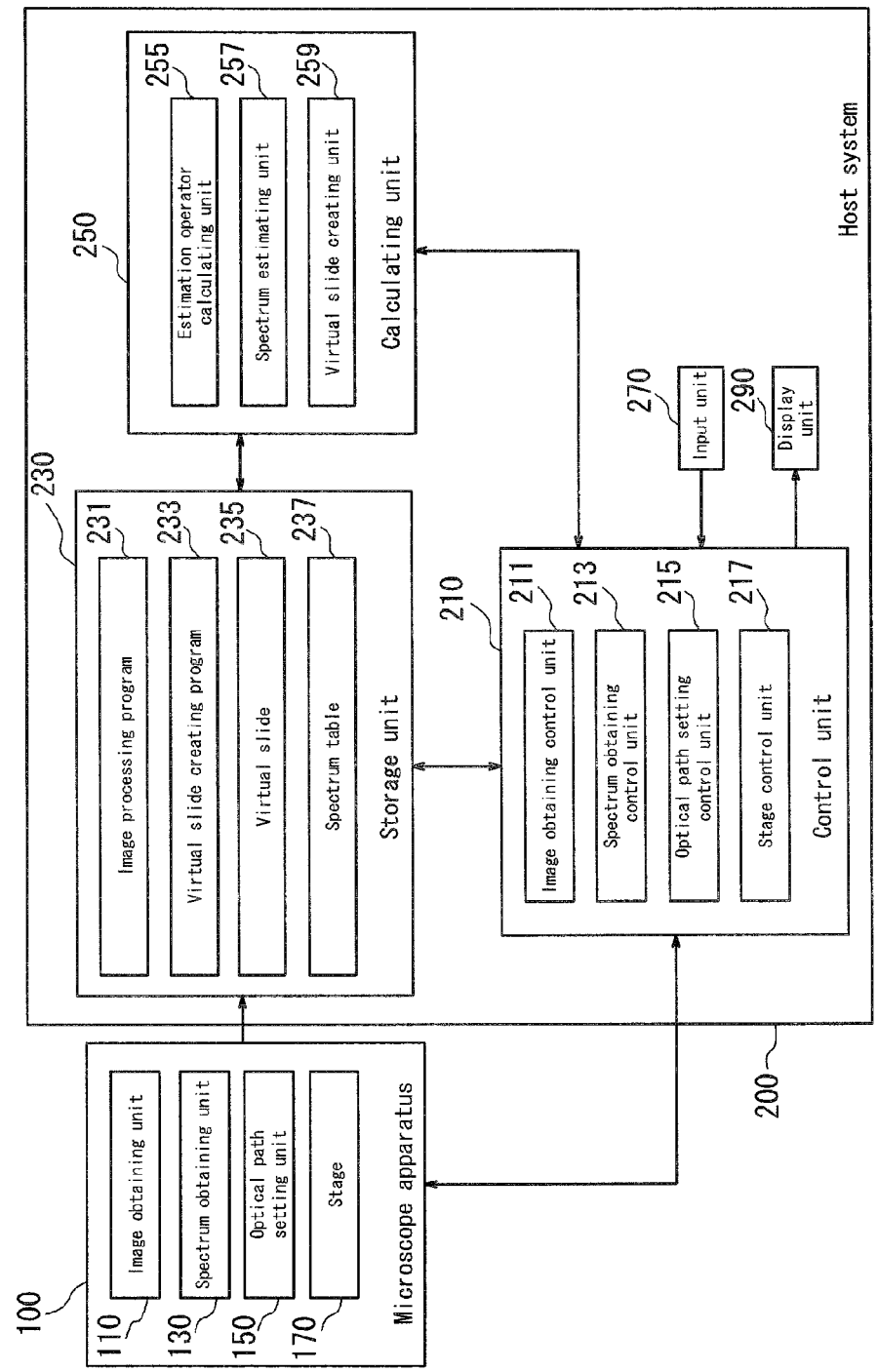
FIG. 5 is a functional block diagram showing a configuration of the virtual microscope system in accordance with the first embodiment.

FIG. 5 is a functional block diagram showing a configuration of the virtual microscope system in accordance with the present embodiment based on the aforementioned principles. The virtual microscope system consists of a microscope apparatus 100 and a host system 200 that controls the microscope apparatus 100 and performs creation of a virtual slide, estimation of spectrum and the like. The microscope apparatus 100 includes an image obtaining unit 110, a spectrum obtaining unit 130, an optical path setting unit 150 and a stage 170.

Figure 6:
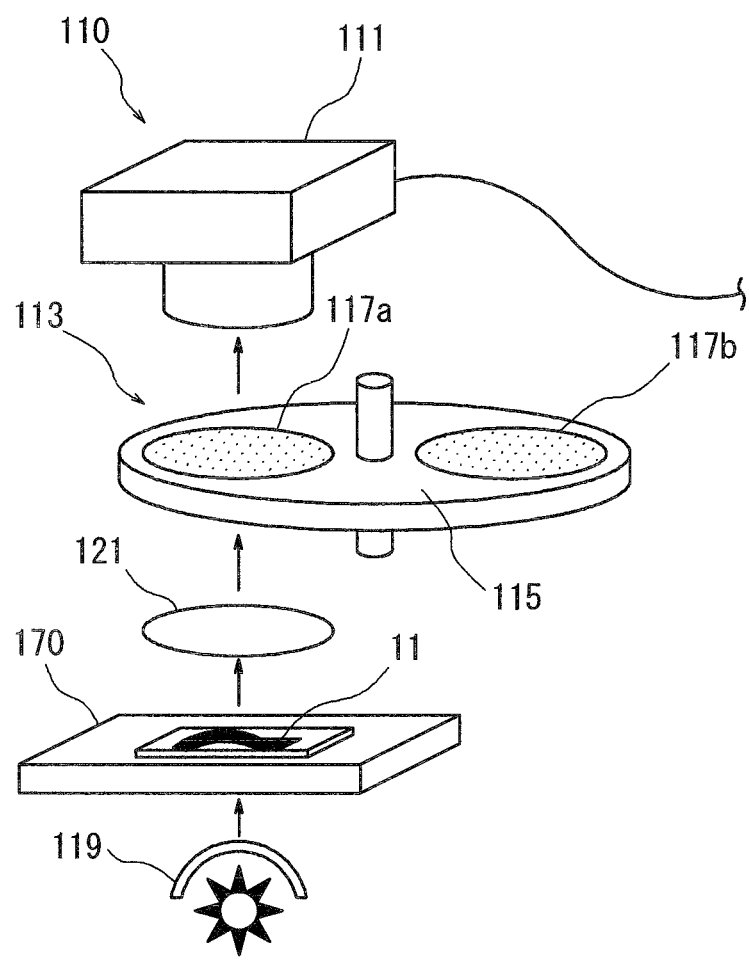
FIG. 6 is a block diagram showing a configuration of main parts of an image obtaining unit shown in FIG. 5.

The image obtaining unit 110 (an equivalent of the image obtaining unit 16 in FIG. 1) obtains an object sample image of one or more bands (in this case, six-band image) of an object sample captured by a microscope and, for example, as shown in FIG. 6 which shows a typical configuration of main parts, includes an RGB camera 111 having an imaging element such as CCD (Charge Coupled Devices) and CMOS (Complementary Metal Oxide Semiconductor) and a filter unit 113 that limits the wavelength band of the image forming light to the predetermined range.

Figure 7:
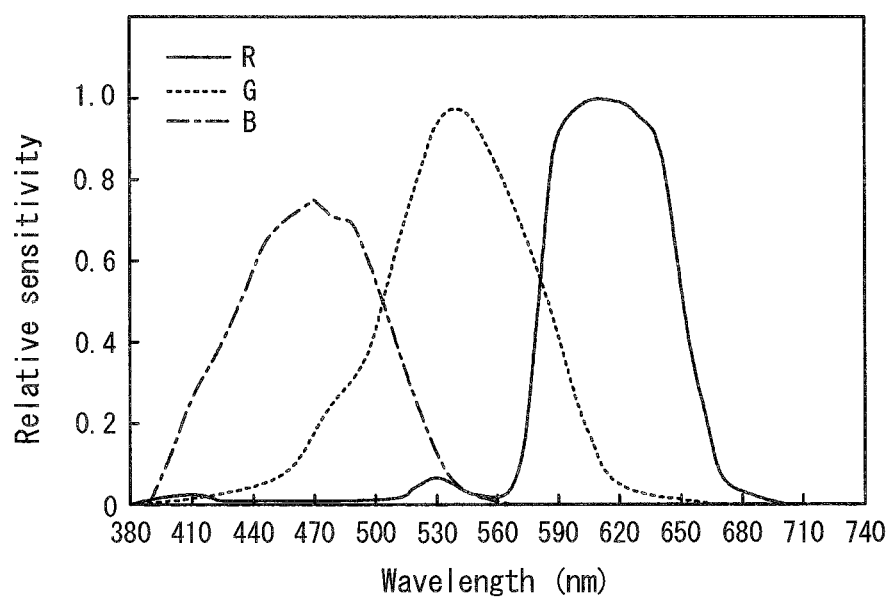
FIG. 7 is a diagram showing a spectral sensitivity characteristic of an RGB camera shown in FIG. 6.

The RGB camera 111 has, as shown in FIG. 7, for example, a spectral sensitivity characteristic of each of R(red), G(green) and B(blue) bands. The filter unit 113 includes a rotatory filter switching unit 115 to which two pieces of optical filters 117a and 117b having different spectral transmittance characters are held so that the transparent wavelength region of each of R, G and B bands is split into two. FIG. 8(a) shows a spectral transmittance characteristic of the optical filter 117a and FIG. 8(b) shows a spectral transmittance characteristic of another optical filter 117b.

First, for example, the optical filter 117a is located on an optical path extending from a light source 119 (an equivalent of the light source 12 in FIG. 1) to the RGB camera 111 so that the light source 119 illuminates the object sample 11 placed on the stage 170, and the transmitted light is formed on the RGB camera 111 through an image forming optical system 121 (an equivalent of the observation optical system 14 in FIG. 1) and the optical filter 117a. In this manner, a first capturing is performed. Thereafter, the filter switching unit 115 is rotated to locate the optical filter 117b on the optical path extending from the light source 119 to the RGB camera 111. Thus, in the same manner, a second capturing is performed.

In this manner, three-band images different from each other are obtained by the first capturing and the second capturing, thereby obtaining multiband images of six bands in total. It should be noted that the number of optical filters provided at the filter unit 113 is not limited to two, and three or more optical filters may be used to obtain images of more bands. The obtained object sample image of the object sample 11 is stored as a part of a virtual slide in a storage unit 230 of a host system 200, which will be described below. The image obtaining unit 110 may obtain only RGB images using the RGB camera 111.

In FIG. 5, a spectrum obtaining unit 130 (an equivalent of the spectrum obtaining unit 17 in FIG. 1) obtains a spectrum of one or more predetermined portions of the object sample image obtained by the image obtaining unit 110, and is provided with a spectrometer that uses an optical fiber and silicon detector corresponding to the predetermined portion. Thus, if a plurality of predetermined portions are set, a plurality of spectrometers are provided.

The optical path setting unit 150 sets an optical path of a light flux converged by the microscope objective lens with respect to the image obtaining unit 110 and the spectrum obtaining unit 130 so that the spectrum obtaining unit 130 can obtain a spectrum of the predetermined portion of the object sample image each time the image obtaining unit 110 obtains an object sample image and, as shown in FIG. 1 or FIG. 4, is constituted by the optical path switching mirror 15a or the beam splitter 15b.

The stage 170 is used for placing an object sample thereon and for positioning the object sample relative to the microscope objective lens, and is constituted by, for example, an electrical stage that is movable in a two-dimensional direction in a plane perpendicular to an optical axis of the microscope objective lens.

On the other hand, the host system 200 includes a control unit 210, a storage unit 230, a calculating unit 250, an input unit 270 and a display unit 290.

The input unit 270 is realized by input apparatus such as, for example, a keyboard, a mouse, a touch panel and various kinds of switches and, in response to the operation inputs, outputs input signals to the control unit 210.

The display unit 290 is realized by a display apparatus such as an LCD (Liquid Crystal Display), an EL (Electro Luminescence) display, a CRT (Cathode Ray Tube) display and displays various screens based on the display signals inputted from the control unit 210.

The calculating unit 250 includes an estimation operator calculating unit 255, a spectrum estimating unit 257 and a virtual slide creating unit 259. The virtual slide creating unit 259 processes each of a plurality of object sample images obtained by multiband capturing of a portion of the object sample 11 by the microscope apparatus 100, thereby creating a virtual slide image.

The storage unit 230 is realized by various IC memories such as a ROM and RAM, like a flash memory capable of updating and storing, data storage media such as a hard disk integrated or connected by data communication terminals and a CD-ROM, and a reader thereof and the like. The storage unit 230 stores an image processing program 231 for processing images obtained by the image obtaining unit 110, a virtual slide creating program 233 for creating a virtual slide, a created virtual slide 235, a spectrum table 237 (an equivalent of the spectrum table 25 in FIG. 2) obtained by the spectrum obtaining unit 130, data to be used during program running and the like.

The control unit 210 includes an image obtaining control unit 211 for controlling the operation of the image obtaining unit 110 to obtain images of the object sample, a spectrum obtaining control unit 213 for controlling the operation of the spectrum obtaining unit 130 to obtain spectra of the object sample, an optical path setting control unit 215 for controlling the operation of the optical path setting unit 150 to switch the optical path and a stage control unit 217 for controlling the stage 170 to move the observation field. The control unit 210 gives instructions or transfers data to each unit constituting the virtual microscope system based on the input signal inputted from the input unit 270, the object sample image inputted from the image obtaining unit 110, the program or the data stored in the storage unit 230 and the like, thereby controlling overall operation. The control unit 210 is realized by hardware such as a CPU. When the optical path setting unit 150 is constituted by the beam splitter 15b as shown in FIG. 4, the optical path setting control unit 215 is not needed.

Although FIG. 5 shows a functional configuration of the host system 200, the actual host system 200 can be realized by a publicly known hardware configuration provided with a CPU, a video board, and a main storage unit such as a main memory (RAM) and an interface device for connecting an external storage unit such as a hard disk and various storage media, a communication device, external inputs and the like. Thus, general-purpose computers such as a workstation and a personal computer can be used as the host system 200.

Figure 9:
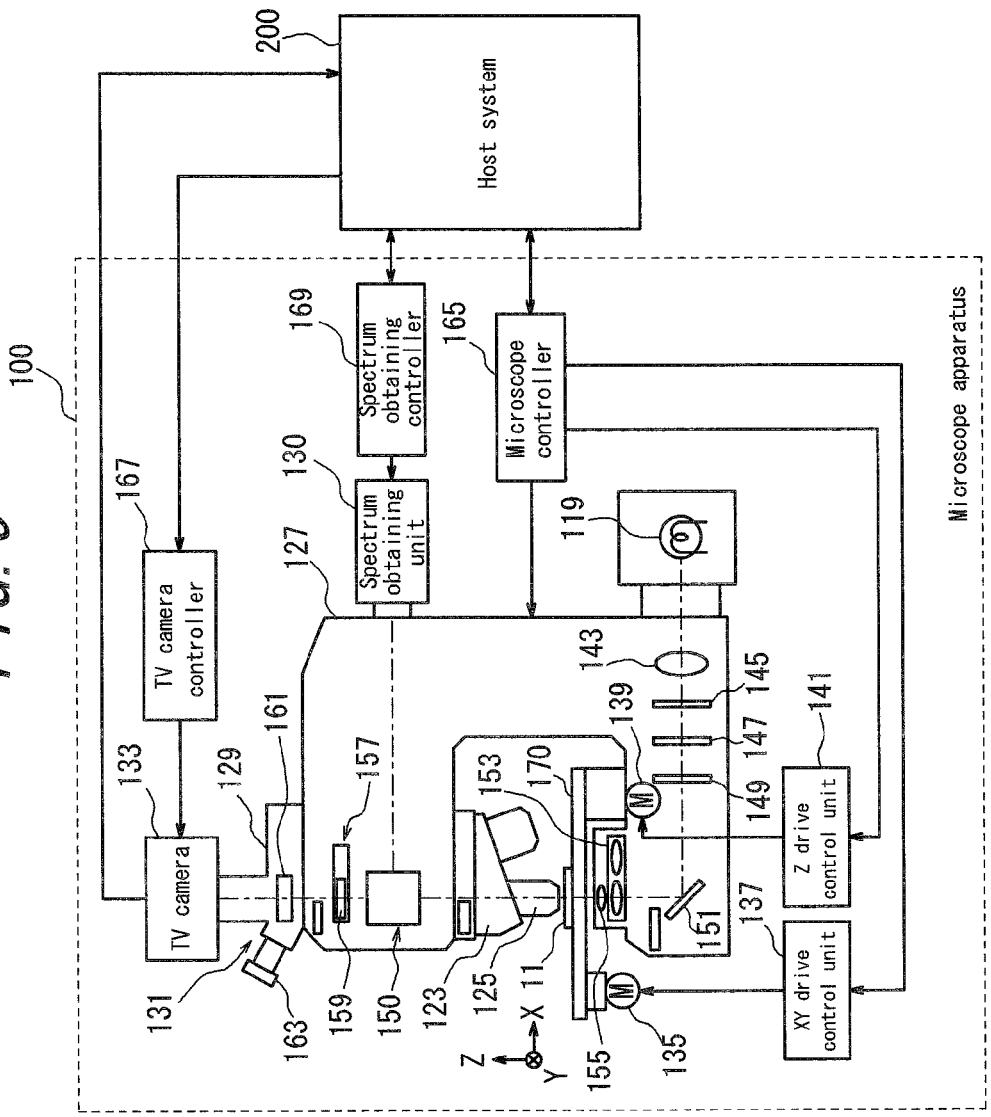
FIG. 9 is a diagram showing a specific configuration of a microscope apparatus shown in FIG. 5.

FIG. 9 is a diagram showing a specific configuration of the microscope apparatus 100 shown in FIG. 5. The microscope apparatus 100 includes the stage 170 on which the object sample 11 is placed, a microscope body 127 having an approximately U shape viewed laterally, that supports the stage 170 and holds an objective lens 125 (an equivalent of the observation optical system 14 in FIG. 1) through a revolver 123, a light source 119 provided rearward of the bottom of the microscope body 127 and a lens tube 129 placed on top of the microscope body 127. Further, a binocular unit 131 for visually observing the sample image of the object sample 11 and a TV camera 133 (an equivalent of the RGB camera 111 in FIG. 6) for capturing the sample image of the object sample 11 and obtaining the object sample image are attached to the lens tube 129. It should be noted that, as shown in FIG. 9, the optical axis direction of the objective lens 125 is defined as a Z direction and the plane perpendicular to the Z direction is defined as an XY plane.

The stage 170 is configured to be movable in X,Y and Z directions. In other words, the stage 170 is movable, in the XY plane, by a motor 135 and an XY drive control unit 137 that controls drive of the motor 135. The XY drive control unit 137 detects a predetermined origin position in the XY plane of the stage 170 by an origin sensor for the XY position (not shown) and controls the driving amount of the motor 135 based on the origin position, thereby moving the observation field of the object sample 11.

Further, the stage 170 is movable in the Z direction by a motor 139 and a Z drive control unit 141 that controls the drive of the motor 139. The Z drive control unit 141 detects a predetermined origin position of the stage 170 in the Z direction by an origin sensor for the Z position (not shown) and controls the driving amount of the motor 139 based on the origin point, thereby moving the focus of the object sample 11 to an arbitrary Z position in a predetermined height range.

The revolver 123 is rotatably held relative to the microscope body 127, and disposes the objective lens 125 above the object sample 11. The objective lens 125 is attached replaceably with other objective lens having a different magnification (observation magnification) relative to the revolver 123 and is inserted into the optical path of the observation light in response to the rotation of the revolver 123 to allow the objective lens 125 used for observation of the object sample 11 to be switched alternatively.

The microscope body 127 includes therein an illumination optical system (an equivalent of the illumination optical system 13 in FIG. 1) for performing transmitted illumination of the object sample 11 at the bottom thereof. In the illumination optical system, a collector lens 143 for collecting illumination light outputted from the light source 119, an illumination system filter unit 145, a field stop 147, an aperture stop 149, a folding mirror 151 for deflecting an optical path of the illumination light along the optical axis of the objective lens 125, a condenser optical element unit 153, a top lens unit 155 and the like are disposed along the optical path of the illumination light in place. The object sample 11 is subject to the illumination light outputted from the light source 119 by the illumination optical system, and the transmitted light therefrom is incident on the objective lens 125 as observation light.

In addition, the microscope body 127 includes the spectrum obtaining unit 130 and the optical path setting unit 150 on an optical path between the objective lens 125 and the lens tube 129 so that an optical path is set on the spectrum obtaining unit 130 and the lens tube 129. The optical path setting unit 150 is constituted by using the optical path switching mirror 15a or the beam splitter 15b shown in FIG. 1 or FIG. 4.

Further, the microscope body 127 includes therein a filter unit 157 on an optical path between the optical path setting unit 150 and the lens tube 129. The filter unit 157 is an equivalent of the filter unit 113 shown in FIG. 7 and rotatably holds two or more optical filters 159 to limit the wavelength band of the light that is focused as a sample image to a predetermined range and appropriately inserts the optical filters 159 into the optical path of the observation light behind the objective lens 125.

The lens tube 129 includes therein a beam splitter 161 for switching the optical path of the observation light passed through the filter unit 157 to lead the light to the binocular unit 131 or the TV camera 133. The sample image of the object sample 11 is introduced in the binocular unit 131 by the beam splitter 161, and is observed visually by a microscopist through an eyepiece 163, or captured by the TV camera 133. The TV camera 133 is constituted by including an imaging element such as CCD or CMOS that forms a sample image (more specifically, a sample image in the field range of the objective lens 125), captures the sample image and outputs the image data of the sample image (object sample image) to the host system 200.

The microscope apparatus 100 further includes a microscope controller 165, a TV camera controller 167 and a spectrum obtaining controller 169. The microscope controller 165 controls overall operation of each part that constitutes the microscope apparatus 100 under the control of the host system 200. For example, the microscope controller 165 switches the objective lens 125 disposed on the optical path of the observation light by rotating the revolver 123 and makes adjustments of each part of the microscope apparatus 100 associated with observation of the object sample 11 such as dimming control of the light source 119 corresponding to the magnification, etc. of the switched objective lens 125, switching of various optical elements or giving instructions for moving the stage 170 to the XY drive control unit 137 and the Z drive control unit 141 and the like, while the microscope controller 165 appropriately reports the state of each unit to the host system 200.

The TV camera controller 167 performs, under the control of the host system 200, ON/OFF switching of the automatic gain control, setting of gain, ON/OFF switching of the automatic exposure control, setting of exposure time and the like to drive the TV camera 133 and controls the capturing operation of the TV camera 133. In addition, the spectrum obtaining controller 169 controls, under the control of the host system 200, the obtaining of a spectrum by the spectrum obtaining unit 130 and provides the obtained spectrum to the host system 200.

Operation of the main parts of the virtual microscope system in accordance with the present embodiment is now described below with reference to the flow charts shown in FIGS. 10 and 11.

Figure 10:
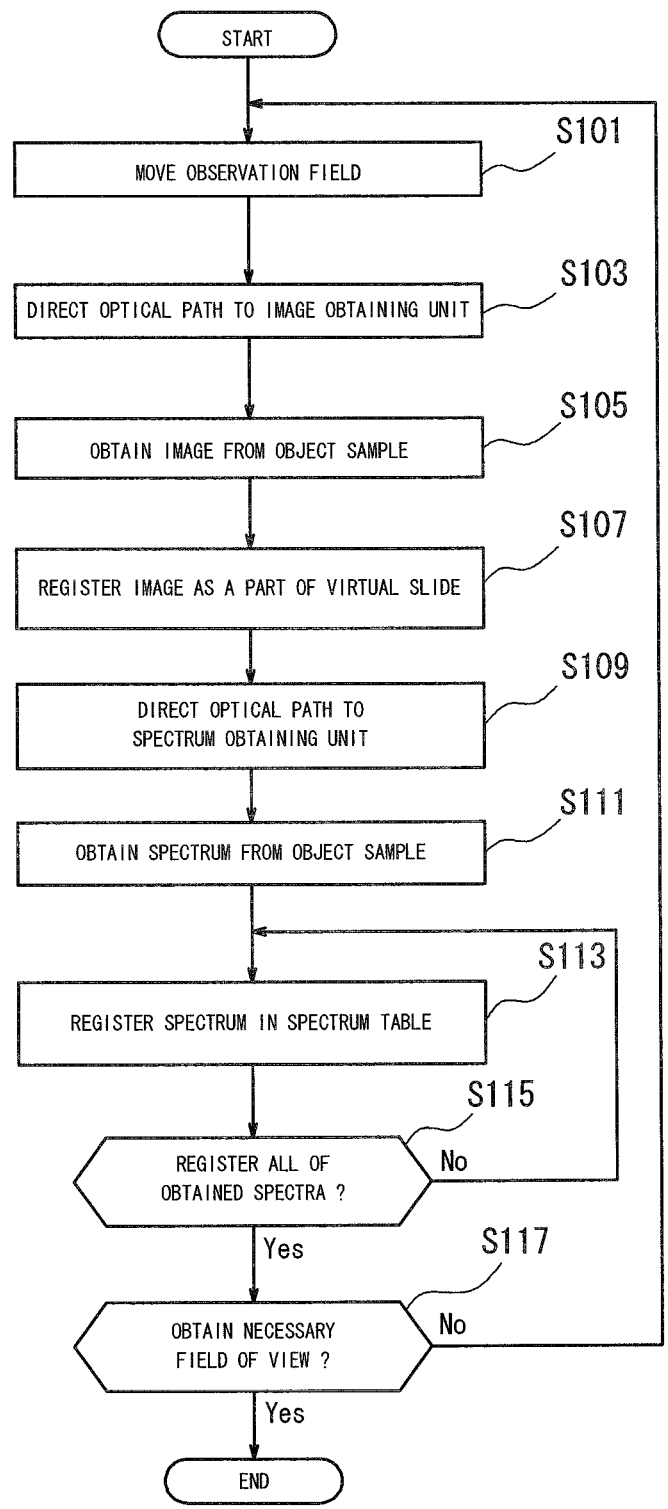
FIG. 10 is a flow chart showing a creation process of a virtual slide and a spectrum table by the virtual microscope system shown in FIG. 5.

FIG. 10 is a flow chart showing creation process of a virtual slide and a spectrum table. First, in the control unit 210, the stage control unit 217 controls the operation of the stage 170 to move the observation field of the object sample 11 (step S101). Next, the optical path setting control unit 215 controls the operation of the optical path setting unit 150 to direct an optical path to the image obtaining unit 110 (step S103).

Thereafter, the image obtaining control unit 211 of the control unit 210 controls the operation of the image obtaining unit 110 to obtain the object sample image of the object sample 11 (step S105), and the obtained object sample image is stored in the storage unit 230 as a part of the virtual slide 235 (step S107).

Thereafter, the optical path setting control unit 215 of the control unit 210 controls the operation of the optical path setting unit 150 to direct an optical path to the spectrum obtaining unit 130 (step S109). Then, the spectrum obtaining control unit 213 of the control unit 210 controls the operation of the spectrum obtaining unit 130 to obtain the spectrum of the object sample 11 (step S111), and the obtained spectrum of the object sample 11 is stored in the spectrum table 237 of the storage unit 230 (step S113). When the spectrum obtaining unit 130 obtains spectrum of a plurality of portions of the object sample image, spectrum is obtained from all of the portions (step S115).

Thereafter, the control unit 210 repeats the steps from S101 to S115 until the required field of the object sample 11 is obtained to create the virtual slide 235 and the spectrum table 237 of the entire or a part of the object sample 11 (step S117). When the optical path setting unit 150 is constituted by the beam splitter 15b, as shown in FIG. 4, steps S103 and S109 are not necessary. In this case, the obtaining process of the object sample image by the image obtaining unit 110 and the obtaining process of the spectrum by the spectrum obtaining unit 130 are performed concurrently or in sequence.

In this manner, a spectrum of the object sample image is obtained by the spectrum obtaining unit 130 each time the object sample image is obtained by the image obtaining unit 110, thereby creating the virtual slide 235 and the spectrum table 237 at high speed. In particular, when the optical path setting unit 150 is constituted by the beam splitter 15b as shown in FIG. 4, time for switching the optical path switching mirror 15a, which is required when using the movable optical path switching mirror 15a, is not needed, thus the virtual slide 235 and the spectrum table 237 can be created at higher speed.

In addition, when the spectrum obtaining unit 130 obtains a spectrum of a plurality of portions of the object sample image, a spectrum table 237 containing more abundant information can be created. Furthermore, the spectra stored in the spectrum table 237 are those obtained from the object sample 11, thus they are the appropriate statistical data for calculating an estimation operator W used for estimating the spectrum of the object sample 11.

Figure 11:
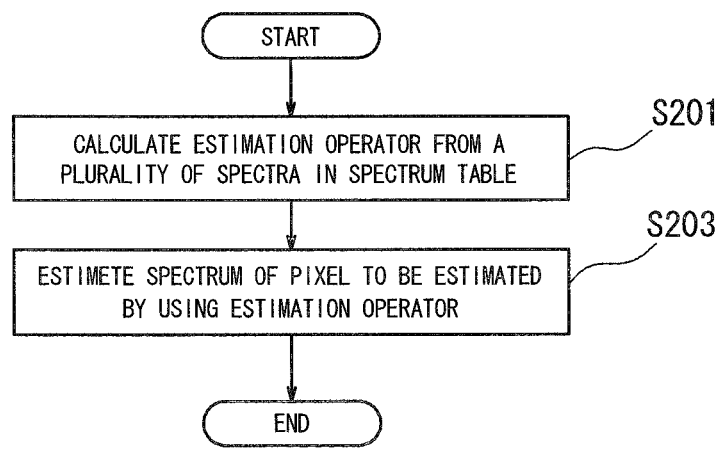
FIG. 11 is a flow chart showing an estimation process of the spectrum by the virtual microscope system shown in FIG. 5.

FIG. 11 is a flow chart showing an estimation process of a spectrum. First, in the control unit 210, the estimation operator calculating unit 255 calculates an estimation operator W indicated in the Equation (6) based on a plurality of spectra stored in the spectrum table 237 (step S201). For that, first, the estimation operator calculating unit 255 finds an average vector V based on the plurality of spectra stored in the spectrum table 237 and, based on the average vector V, calculates an autocorrelation matrix, Rss, by the Equation (7) shown below. Here, the suffix T denotes transposition of determinant.

$$R_{SS} = \Sigma V \cdot V^T \qquad (7)$$

Thereafter, the estimation operator calculating unit 255 calculates, based on the autocorrelation matrix Rss, an estimation operator W by the Equation (6). The Equation (6) is shown again below.

$$W = R_{SS} H^t (R_{SS} H^t + R_{NN})^{-1} \qquad (6)$$

Where, $(\ )^t$: transposed matrix, and $(\ )^{-1}$: inverse matrix.

Thus the estimation operator W that is appropriate for estimating a spectrum of the object sample image is obtained. The obtained estimation operator W is stored in the storage unit 230. As to the spectrum used for calculation of autocorrelation matrix, all of the spectra stored in the spectrum table 237 may be used or a part thereof may be extracted for a certain purpose by eliminating specific data. In addition, when the data amount is insufficient, spectra for other samples or general-purpose spectra may be used together. Further, instead of an autocorrelation matrix, a covariance matrix may be used.

Thereafter, in the control unit 210, the spectrum estimating unit 257 estimates a spectrum of the object sample 11 based on the pixel value of the pixel to be estimated, included in the virtual slide 235 (step S203). In other words, in the spectrum estimating unit 257, the estimation value $\hat{T}(x)$ of the spectral transmittance at a corresponding sample point of the object sample 11 is estimated based on the pixel value G(x) of the pixel to be estimated by using the estimation operator W of the aforementioned Equation (5), which is shown again below.

$$\hat{T}(x) = WG(x) \qquad (5)$$

In this manner, spectrum estimation error can be reduced by estimating the estimation value $\hat{T}(x)$ of the spectral transmittance. The estimation value $\hat{T}(x)$ of the spectral transmittance is stored in the storage unit 230.

As mentioned above, according to the virtual microscope system in accordance with the present embodiment, the spectrum table 237 and the virtual slide 235 can be created almost simultaneously, thereby estimating a spectrum at high speed. In addition, when the optical path setting unit 150 is constituted by the beam splitter 15b, a spectrum can be estimated at higher speed. Further, since the estimation operator appropriate for the object sample can be calculated, estimation error in spectrum estimation can be reduced. Moreover, when the spectrum obtaining unit 130 obtains a spectrum of a plurality of portions of the object sample image, estimation error in spectrum estimation can be further reduced.

Second Embodiment

Figure 12:
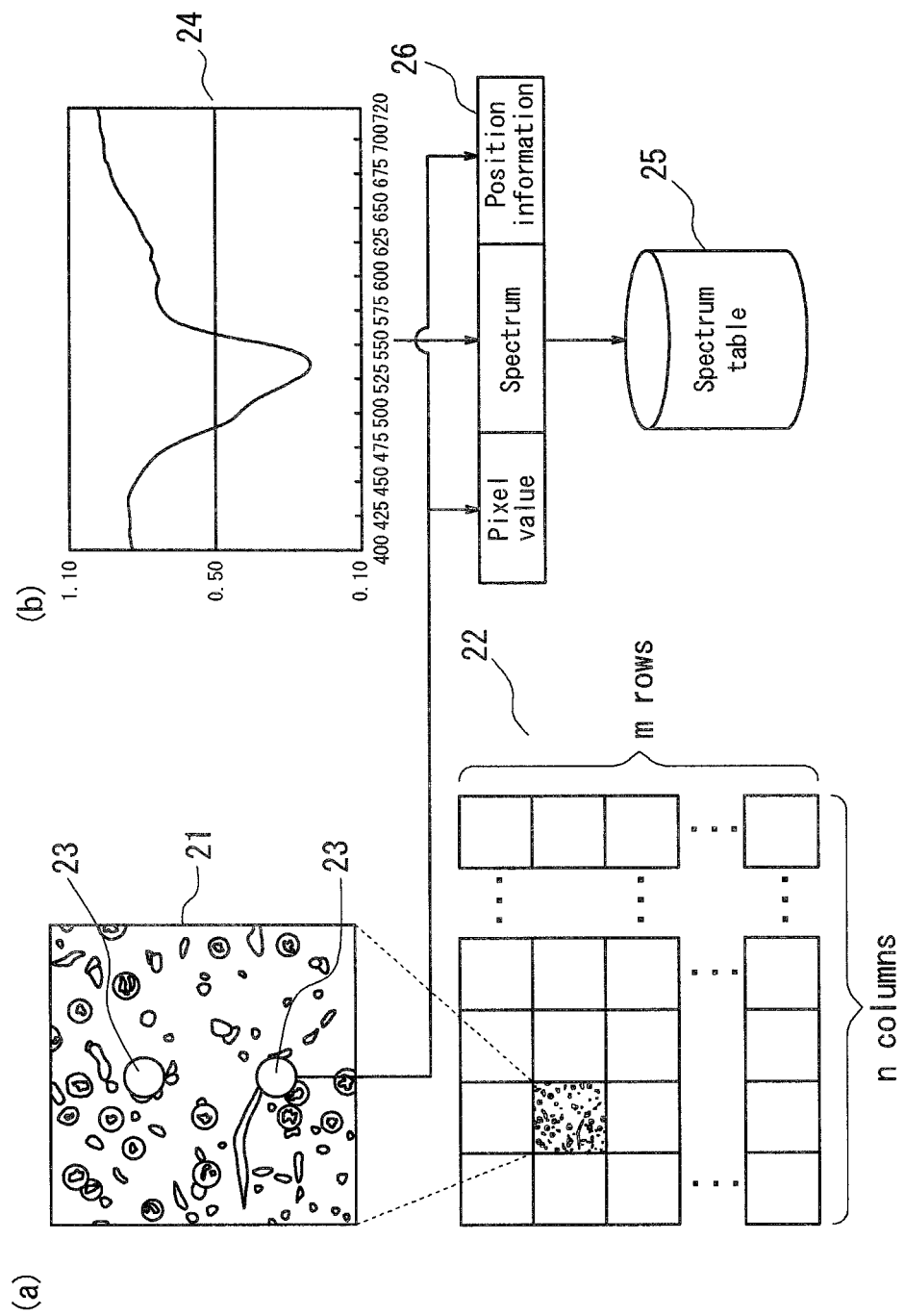
FIG. 12 is a diagram for illustrating the principles of a virtual microscope system in accordance with a second embodiment of the present invention.

FIGS. 12(a) and 12(b) are diagrams for illustrating the principles of a virtual microscope system in accordance with a second embodiment of the present invention. In the virtual microscope system in accordance with the present embodiment, in addition to the operation principles of the first embodiment described by FIGS. 2(a) and 2(b), when the spectrum 24 obtained from the object sample image is registered in the spectrum table 25, the pixel value of the pixel and the position information of the portion 23 where the spectrum 24 is measured are obtained from the object sample image 21 and are stored as a data set 26 in the spectrum table 25, thereby creating a spectrum table containing a pixel value almost simultaneously with creation of a virtual slide. Other than that are the same as the principles shown in FIGS. 2(a) and 2(b).

Figure 13:
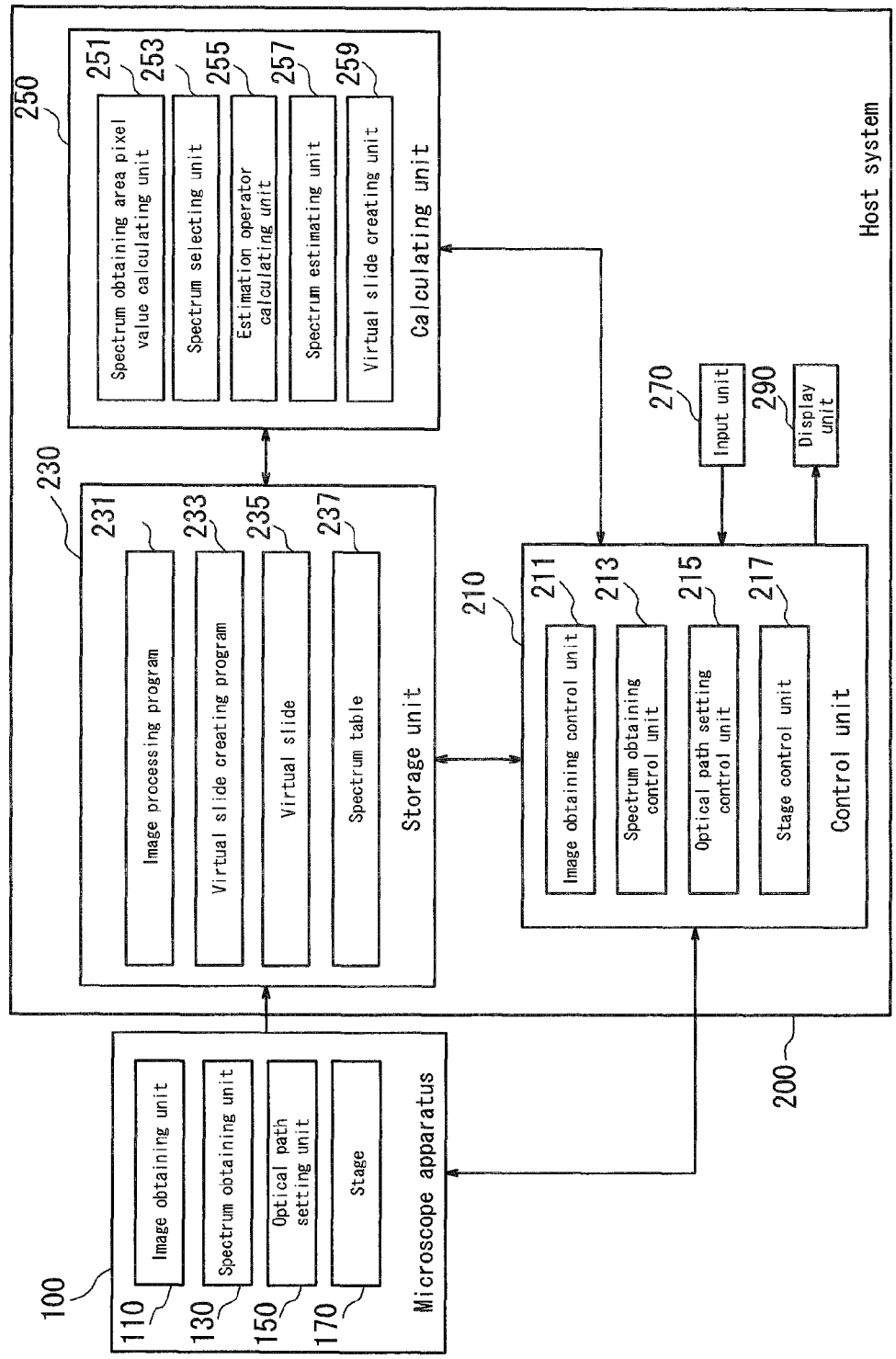
FIG. 13 is a functional block diagram showing a configuration of the virtual microscope system in accordance with the second embodiment.

FIG. 13 is a functional block diagram showing a configuration of the virtual microscope system in accordance with the present embodiment based on the aforementioned principles. In the virtual microscope system, the calculating unit 250 of the host system 200 has a configuration that is different from that shown in FIG. 5. In other words, the calculating unit 250 includes, in addition to the estimation operator calculating unit 255, the spectrum estimating unit 257 and the virtual slide creating unit 259 shown in FIG. 5, a spectrum obtaining area pixel value calculating unit 251 for calculating a pixel value in a spectrum obtaining area from the object sample image and a spectrum selecting unit 253 for selecting a spectrum from the spectrum table 237. Other than that, the configuration is the same as that shown in FIG. 5, thus the components having the same function are assigned with the same numerical symbols and descriptions thereof are omitted.

Operation of the main parts of the virtual microscope system in accordance with the present embodiment is described below.

Figure 14:
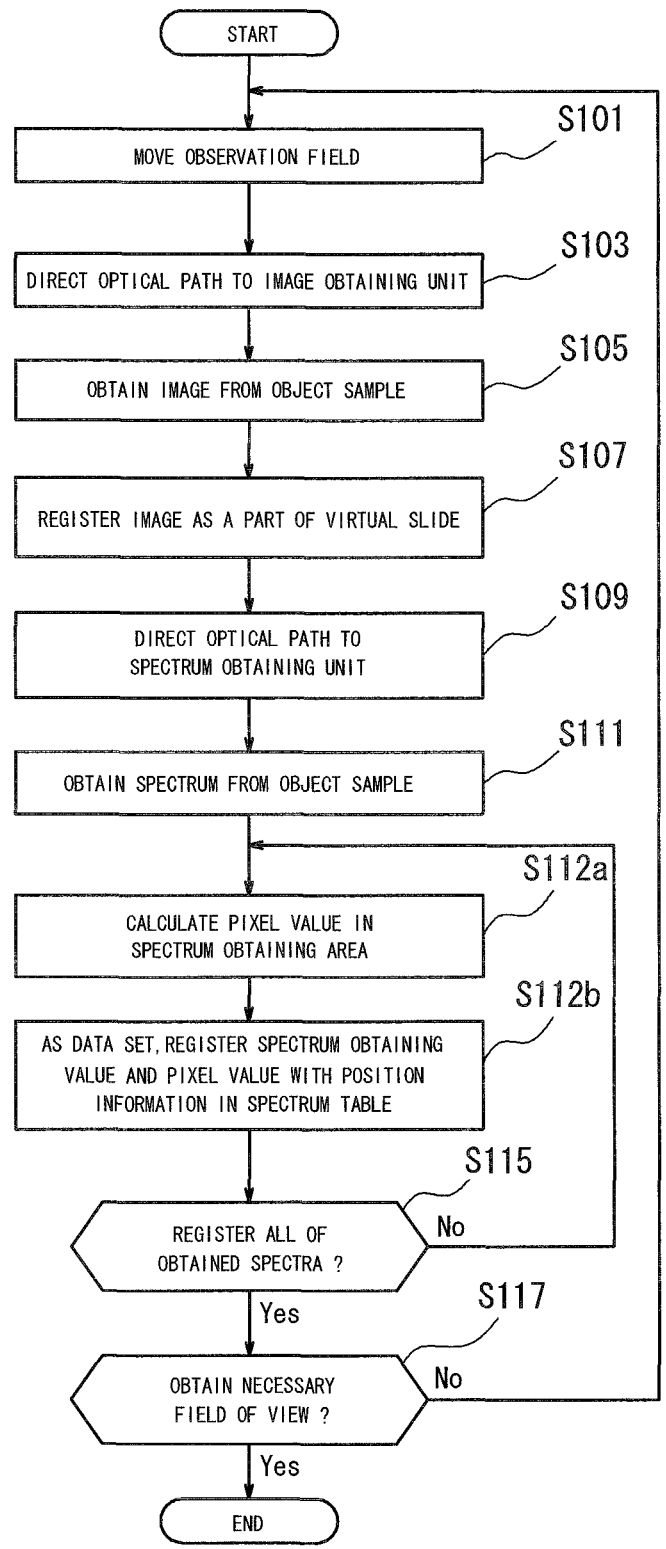
FIG. 14 is a flow chart showing a creation process of a virtual slide and a spectrum table by the virtual microscope system shown in FIG. 13.

FIG. 14 is a flow chart showing a creation process of a virtual slide and a spectrum table. First, the control unit 210 performs steps S101 to S111, as in the case of the first embodiment shown in FIG. 10. Thereafter, the spectrum obtaining area pixel value calculating unit 251 of the control unit 210 calculates the pixel value in the spectrum obtaining area from the corresponding object sample image (step S112a). In this case, with respect to the image obtaining unit 110 and the spectrum obtaining unit 130, their optical axes are aligned by the optical path setting unit 150, thereby enabling the spectrum obtaining area pixel value calculating unit 251 to obtain the pixel in the area in which the spectrum is obtained.

In general, the spatial resolution of the spectrum obtaining unit 130 is lower than that of the image obtaining unit 110. Therefore, the spectrum obtaining area pixel value calculating unit 251 executes convolution of the pixel value G of the pixel in the area in which the spectrum is obtained and the light receiving characteristic A of the spectrum obtaining unit 130 by the Equation (8), thereby calculating the pixel value corresponding to the spectrum based on the pixel value of the pixel in the area in which the spectrum is obtained.

$$\hat{G}(x, y) = \sum_{j=y-D}^{y+D} \sum_{i=x-D}^{x+D} G(i, j) A(i, j) \qquad (8)$$

The pixel value corresponding to the spectrum is not limited to the aforementioned value, and can be a pixel value of the central pixel in the area in which the spectrum is obtained or the statistical values such as average value, mode value, median value of the pixel values of the pixels in the area in which the spectrum is obtained. Further, the pixel value can be an obtained pixel value, a pixel value converted to the color space such as L*a*b* space, or a feature value calculated from a pixel value.

The spectrum obtained at the step S111 and the pixel value calculated at the step S112a are stored with the information of the position at which the spectrum is obtained in the spectrum table 237 as a data set (step S112b). The following steps from S115 to S117 are the same as those of the first embodiment.

Figure 15:
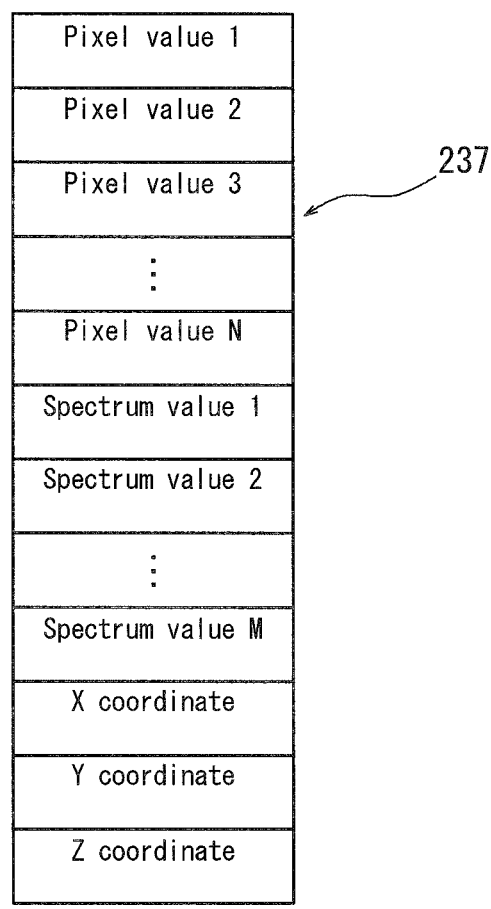
FIG. 15 is a diagram showing an example of a spectrum table created by a process shown in FIG. 14.

In this manner, as shown in FIG. 15, for example, the spectrum table 237 in which the pixel values, the spectrum values and the pixel positions are correlated as a data set can be obtained. Thus, the statistical data which is more appropriate for calculating the estimation operator W for estimating a spectrum of an object sample can be obtained.

Figure 16:
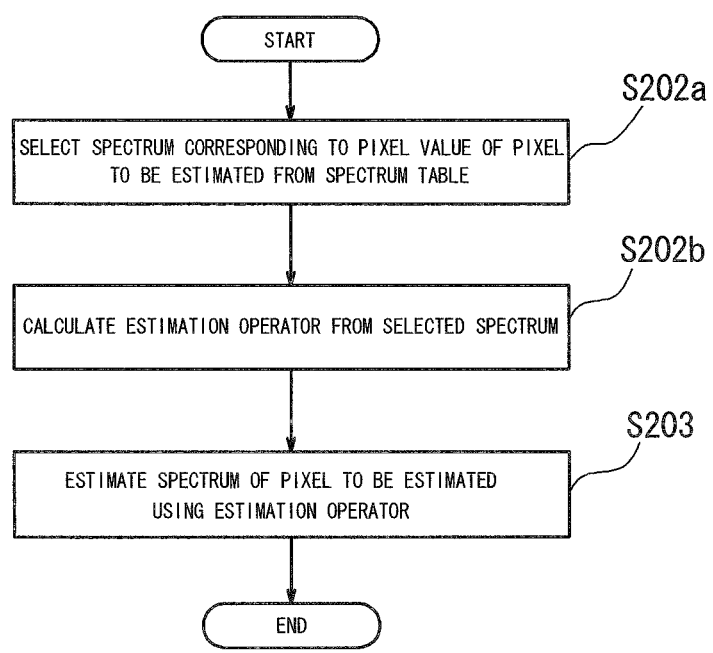
FIG. 16 is a flow chart showing a spectrum estimation process by the virtual microscope system shown in FIG. 13.

FIG. 16 is a flow chart showing an estimation process of a spectrum. First, in the control unit 210, the spectrum selecting unit 253 selects a spectrum from the spectrum table 237 based on the pixel value of the pixel to be estimated included in the virtual slide 235 (step S202a). Thus, the spectrum selecting unit 253 first calculates the pixel value of the pixel to be estimated and the similarity d of pixel values of each data set on the spectrum table 237.

For the similarity d, the statistical value such as the Euclidean distance between two pixel values, for example, is used. In this case, the Euclidean distance between the two pixel values that have been converted to L*a*b* space means color difference. Further, the similarity d may be calculated per band so that all bands satisfy the conditions or a part of the bands satisfies the conditions. Moreover, the data set on the spectrum table 237 to be compared may be limited to the data set in which the difference between the two pixel values is within the arbitrary threshold. Thus search at high speed can be realized.

When the similarity d is the Euclidean distance between the two pixel values, the Euclidean distance between the same values is zero. Therefore, the value approaches zero as the similarity increases. Thus the predetermined numbers of data sets are selected in order from the small similarity. In this case, the predetermined numbers may be determined from experience. In addition, the data set having the similarity that is smaller than the predetermined threshold may be selected. In this case, the predetermined threshold may be determined from experience. Thus the statistical data similar to the pixel value of the pixel to be estimated can be selected. In this manner, the statistical data most suitable for calculating the estimation operator W for estimating the spectrum of the pixel to be estimated can be selected. The selected data set and the calculated similarity d are stored in the storage unit 230.

Thereafter, the estimation operator calculating unit 255 of the control unit 210 calculates the estimation operator W based on the selected data set by the aforementioned Equation (6) (step S202b). Thus, the estimation operator calculating unit 255 first finds the weighted average vector V' based on the selected data set and the similarity d, by the Equation (9) shown below.

$$V' = \frac{\sum_{i=1}^{N} \frac{1}{d_i} \cdot T_i}{\sum_i \frac{1}{d_i}} \quad (9)$$

Thereafter, the estimation operator calculating unit 255 calculates the autocorrelation matrix Rss based on the weighted average vector V', by the Equation (10) below. Here, the suffix T denotes transpose of determinant (matrix).

$$R_{SS} = \Sigma V' \cdot V'^T \quad (10)$$

Thereafter, the estimation operator calculating unit 255 calculates the estimation operator W based on the autocorrelation matrix Rss, by the aforementioned Equation (6). The Equation (6) is shown again below.

$$W = R_{SS} H^t (R_{SS} H^t + R_{NN})^{-1} \quad (6)$$

Where, ( )$^t$: transposed matrix, and ( )$^{-1}$: inverse matrix.

In this manner, the estimation operator W that is most suitable for estimating the spectrum of the pixel to be estimated is obtained. The obtained estimation operator W is stored in the storage unit 230. Thereafter, as in the case of the first embodiment shown in FIG. 11, the spectrum of the pixel to be estimated is estimated by using the calculated estimation operator at the step S203, thereby reducing the estimation error of spectrum at each pixel.

Thus, according to the virtual microscope system in accordance with the present embodiment, the spectrum table 237 containing a data set, that is, a spectrum, a pixel value of the portion from which the spectrum is obtained and the position information, is obtained almost simultaneously with creation of the virtual slide. Therefore, in addition to the effect by the first embodiment, a spectrum can be estimated more precisely.

Figure 17:
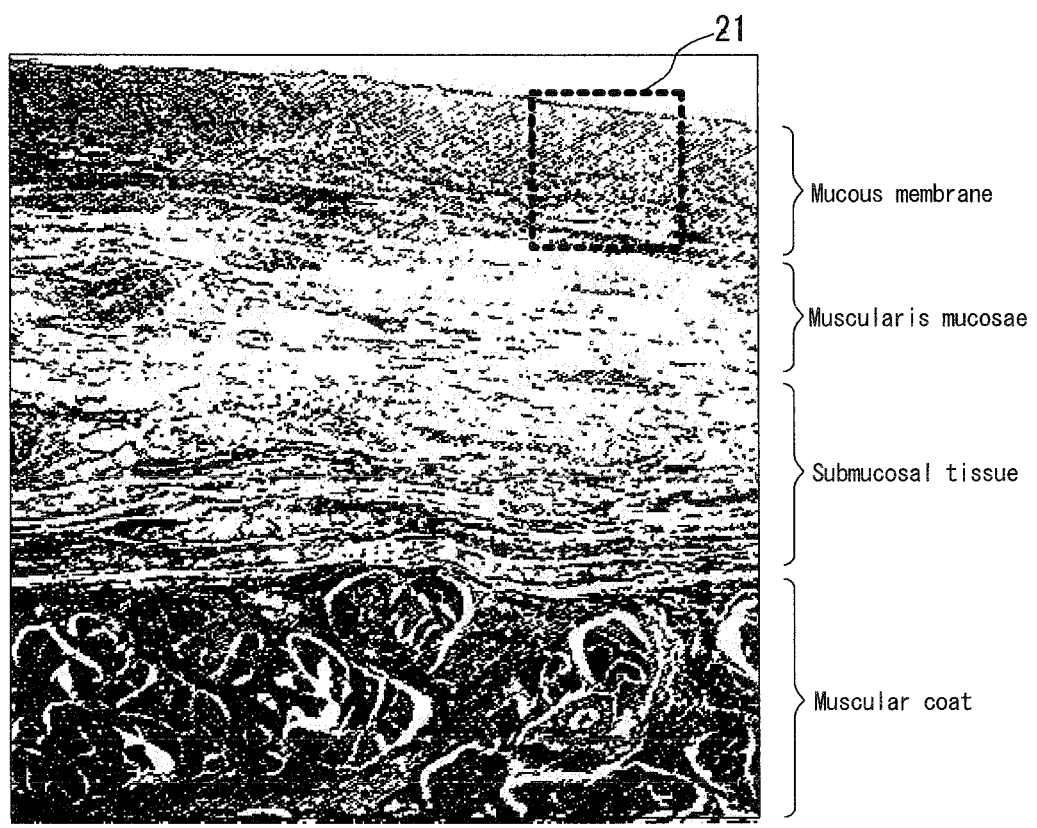
FIG. 17 is a diagram showing an object sample having a plurality of tissues.

For example, in the case where the virtual slide 235 is created by obtaining the object sample image 21 (tile) in the size shown in FIG. 17 from the object sample 11 having a plurality of tissues, in a single capturing, and obtaining sample images of other tiles in series, proximal tiles are highly likely to contain the same tissue or tissues having a similar characteristic. Thus, in such case, when estimating a spectrum, it is more preferable to use, as the teacher data, the spectra that are measured in the same tissue or in the tissues having a similar characteristic. According to the embodiment of the present embodiment, as mentioned above, the spectrum table 237 containing a data set of a spectrum, a pixel value of the portion from which the spectrum is obtained and the position information is obtained. Therefore, based on the position information, the teacher data for the proximal position to the pixel to be estimated can be used for estimating a spectrum. Thus a spectrum can be estimated from the teacher data of the same tissue or of the tissue which is highly likely to be the tissue having the similar characteristic, thereby enabling more precise estimation.

Figure 18:
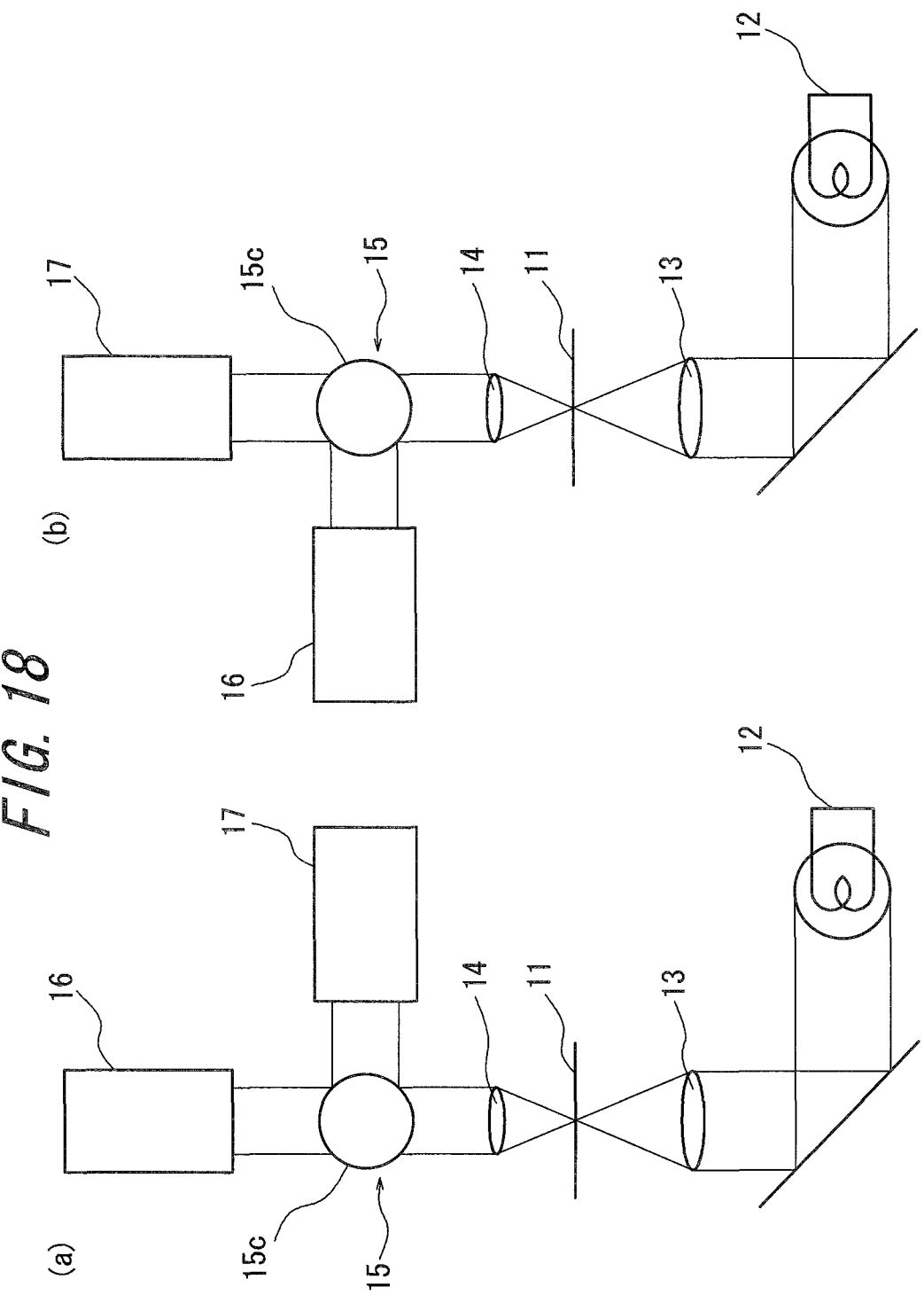
FIG. 18 is a diagram showing other configuration of the optical path setting unit shown in FIG. 1.

The present invention is not limited to the aforementioned embodiments, and many variations and modifications are available. For example, the optical path setting unit 15 shown in FIGS. 1, 3 and 4 may be, as shown in FIGS. 18(a) and 18(b), constituted by a disposition switching mechanism 15c by which disposition of the image obtaining unit 16 and the spectrum obtaining unit 17 are switched mechanically with respect to the optical path of the observation optical system 14 to allow the observation light to be incident on the image obtaining unit 16 in the state of FIG. 18(a) and to allow the observation light to be incident on the spectrum obtaining unit 17 in the state of FIG. 18(b). Further, the observation field of the object sample may be switched not only by moving the stage, but also by moving the microscope objective lens or by moving both the stage and the microscope objective lens.

In addition, in the second embodiment, the spectrum having the smallest similarity d may be used as a spectrum estimation value. In this case, although the spectrum estimation error is larger than the case where a spectrum is estimated, high speed processing is possible because spectrum estimation is not performed. Further, the weight of the weighted average vector V' may be set by the Equation (9), and in addition, may be set appropriately. Moreover, an estimation operator may be calculated by using a spectrum of other sample, or general spectrum, without performing such weighting. Further, an estimation operator may be calculated by using a covariance matrix instead of an autocorrelation matrix. In addition, a data set containing a spectrum may be a data set of a spectrum and a pixel value of the position from which the spectrum is obtained or a data set of a spectrum and the pixel position from which the spectrum is obtained.

What is claimed is:

1. A virtual microscope system for capturing a stained sample to estimate a spectrum, comprising:
   an image obtaining unit for obtaining a stained sample image of one or more bands in one observation field of the stained sample;
   a spectrum obtaining unit for obtaining a spectrum at one or more predetermined portions in the observation field of the stained sample image;
   an optical path setting unit for setting an optical path of a light flux passed through the stained sample, with respect to the image obtaining unit and the spectrum obtaining unit by splitting the optical path of a light flux passed through the stained sample; and
   a control unit for controlling, until obtaining images for each of a plurality of required observation fields of the stained sample, wherein each of the plurality of observation fields are at different spatial locations of the stained sample as compared to each other, to repeat obtaining the spectrum of the stained sample image by the spectrum obtaining unit each time the stained sample image is obtained by the image obtaining unit so that generating a virtual slide image with patched multiband images in the plurality of required observation fields of the stained sample and a spectrum table containing at least the spectrum and a pixel value.

2. The virtual microscope system according to claim 1, wherein
the optical path setting unit has an optical path switching mirror for switching the optical path of the light flux so that the light flux passed through the stained sample is selectively incident on the image obtaining unit or the spectrum obtaining unit.

3. The virtual microscope system according to claim 1, wherein
the optical path setting unit has a disposition switching mechanism for selectively placing the image obtaining unit or the spectrum obtaining unit on the optical path of the light flux passed through the stained sample.

4. The virtual microscope system according to claim 1, wherein
the optical path setting unit has a beam splitter for splitting the optical path of the light flux so that the light flux passed through the stained sample is incident on the image obtaining unit and the spectrum obtaining unit simultaneously.

5. The virtual microscope system according to claim 1, wherein
the image obtaining unit is any one of an RGB camera, a monochrome camera, a two or more bands camera, and a multiband camera provided with a camera and an optical filter.

6. The virtual microscope system according to claim 1, wherein
the spectrum obtaining unit has an optical magnification increasing unit for magnifying the stained sample image and obtains the spectrum from the stained sample image magnified by the optical magnification increasing unit.

7. The virtual microscope system according to claim 1, further comprising:
a spectrum obtaining position pixel value calculating unit for obtaining a pixel value at a position of the spectrum obtained by the spectrum obtaining unit from the stained sample image obtained by the image obtaining unit.

8. The virtual microscope system according to claim 1, further comprising:
an estimation operator calculating unit for calculating an estimation operator from the spectrum table; and
a spectrum estimating unit for estimating a spectrum of a pixel included in the virtual slide by using the estimation operator.

9. The virtual microscope system according to claim 8, further comprising:
a spectrum selecting unit for selecting a plurality of spectra corresponding to the pixel value of a pixel included in the virtual slide from the spectrum table, wherein
the estimation operator calculating unit calculates an estimation operator for each pixel value from the plurality of spectra selected by the spectrum selecting unit; and
the spectrum estimating unit estimates the spectrum of the pixel that makes up the virtual slide by using the estimation operator for each of the pixel value.

10. The virtual microscope system according to claim 8, further comprising:
a spectrum selecting unit for selecting a spectra corresponding to the pixel value of a pixel included in the virtual slide from the spectrum table, wherein
the spectrum selected by the spectrum selecting unit is a spectrum estimation value.

11. The virtual microscope system according to claim 7, wherein
the pixel value stored in the spectrum table is any one of an obtained pixel value, a pixel value converted to a color space and a feature value calculated from the pixel value.

12. The virtual microscope system according to claim 7, wherein
the spectrum table consists of a data set containing at least the spectrum, the pixel value and the information of the pixel position from which the spectrum is obtained.

13. The virtual microscope system according to claim 7, wherein
the spectrum obtaining position pixel value calculating unit calculates any one of a pixel value of the center pixel in an obtaining area of the spectrum, a statistical value of the pixel value of the pixel in the obtaining area, and a value calculated by convolving the pixel value in the obtaining area with a light-receiving characteristic of the spectrum obtaining unit.

\* \* \* \* \*